United States Patent
Milbourne et al.

(10) Patent No.: US 9,065,106 B2
(45) Date of Patent: Jun. 23, 2015

(54) BATTERY PACK WITH GUIDE RAILS FOR IMPROVED TERMINAL ALIGNMENT

(71) Applicant: Black & Decker Inc., Newark, DE (US)

(72) Inventors: Rodney D. Milbourne, Abingdon, MD (US); John S. Vantran, Parkton, MD (US)

(73) Assignee: BLACK & DECKER INC., Newark, DE (US)

( * ) Notice: Subject to any disclaimer, the term of this patent is extended or adjusted under 35 U.S.C. 154(b) by 287 days.

(21) Appl. No.: 13/677,670

(22) Filed: Nov. 15, 2012

(65) Prior Publication Data
US 2014/0106195 A1  Apr. 17, 2014

Related U.S. Application Data

(60) Provisional application No. 61/714,801, filed on Oct. 17, 2012.

(51) Int. Cl.
*H01M 2/10* (2006.01)

(52) U.S. Cl.
CPC ........ *H01M 2/1022* (2013.01); *Y10T 29/49826* (2015.01); *H01M 2/1066* (2013.01)

(58) Field of Classification Search
CPC ............................ H01M 2/1022; H01M 2/1066
USPC .................................................... 429/99, 100
See application file for complete search history.

(56) References Cited

U.S. PATENT DOCUMENTS

| 7,944,174 | B2 | 5/2011 | Casalena et al. |
| 2007/0080667 | A1* | 4/2007 | Ziegler et al. ................. 320/132 |
| 2007/0298319 | A1 | 12/2007 | Barwick |
| 2008/0166624 | A1 | 7/2008 | Teng et al. |
| 2010/0156350 | A1 | 6/2010 | Murayama et al. |
| 2012/0045667 | A1 | 2/2012 | Yoneda et al. |

FOREIGN PATENT DOCUMENTS

JP  2011249251  8/2011

* cited by examiner

*Primary Examiner* — Nicholas P D'Aniello
(74) *Attorney, Agent, or Firm* — Harness, Dickey & Pierce, P.L.C.

(57) ABSTRACT

A battery pack may include a battery cell, a cradle, a board and a housing. The cradle may be coupled with the battery cell and may include one or more guide members extending from and integrally formed with a surface of the cradle. The board may be mounted to the cradle and may include a plurality of terminal contacts electrically connected with the battery cell. The one or more guide members may be adapted to guide a device into engagement with the terminal contacts. The housing may at least partially enclose the cradle and the battery cell and may include one or more guide apertures and a plurality of terminal apertures. The one or more guide members may protrude through the one or more guide apertures. Each of the terminal apertures may be aligned with a corresponding one of the plurality of contacts.

9 Claims, 6 Drawing Sheets

BATTERY PACK WITH GUIDE RAILS FOR IMPROVED TERMINAL ALIGNMENT

CROSS-REFERENCE TO RELATED APPLICATIONS

This application claims the benefit of U.S. Provisional Application No. 61/714,801, filed on Oct. 17, 2012. The entire disclosure of the above application is incorporated herein by reference.

FIELD

The present disclosure relates to a battery pack for powering an electric device.

BACKGROUND

Electric tools and appliances are often powered by rechargeable battery packs to provide convenience and mobility. The battery packs can include nickel-cadmium (NiCd), nickel metal-hydride (NiMH), lead-acid and/or Lithium-ion (Li-ion) battery cells, for example. These battery packs may be coupled with the cordless devices and may power an electric motor of the device, for example. The battery pack may be removed from the cordless device and charged in a battery charger or charged in the cordless device itself.

Terminal assemblies can be provided on the battery pack, the cordless device and the charger for releasably mechanically and electrically connecting the battery pack to the cordless device or charger. Due to the frequent interconnections between the terminal blocks associated with connecting and disconnecting the battery pack from the cordless device and the charger, any misalignment between mating contacts on the terminal blocks may damage the terminal assemblies. This misalignment can adversely affect the electrical connection between the two terminal assemblies, which can render the battery pack unusable.

This section provides background information related to the present disclosure and is not necessarily prior art.

SUMMARY

This section provides a general summary of the disclosure, and is not a comprehensive disclosure of its full scope or all of its features.

In one form, the present disclosure provides a battery pack that may include a battery cell, a cradle, a board and a housing. The cradle may be coupled with the battery cell and may include one or more guide members extending from and integrally formed with a surface of the cradle. The board may be mounted to the cradle and may include a plurality of terminal contacts electrically connected with the battery cell. The one or more guide members may be adapted to guide a device (e.g., an electric tool or appliance, a battery charger and/or an assembly fixture) into engagement with the terminal contacts. The housing may at least partially enclose the cradle and the battery cell and may include one or more guide apertures and a plurality of terminal apertures. The one or more guide members may protrude through the one or more guide apertures. Each of the terminal apertures may be aligned with a corresponding one of the plurality of contacts.

In another form, the present disclosure provides a method of manufacturing a battery pack. The method may include providing a battery cell, a cradle and a board. The cradle may include a mounting interface and one or more guide members. The mounting interface may include an engagement feature. The board may include a terminal contact attached thereto. The method may also include coupling the cradle to the battery cell and coupling the board to mounting interface of the cradle to allow relative movement between the board and the cradle. The one or more guide members may be engaged with one or more corresponding surfaces of a fixture. The board may be positioned relative to the cradle by engaging a terminal member of the fixture with the terminal contact.

In yet another form, the present disclosure provides a battery pack that may include a plurality of battery cells, a cradle, a board and a housing. The cradle may be coupled with the battery cells and may include first and second guide members extending from and integrally formed with a surface of the cradle. The board may be mounted to the cradle and may include a plurality of terminal contacts electrically connected with the battery cells. The housing may at least partially enclose the cradle and the battery cells and may include first and second guide apertures and a plurality of terminal apertures. The first and second guide members may protrude through the first and second guide apertures, respectively. Each of the terminal apertures may be aligned with a corresponding one of the plurality of contacts. Openings of the terminal apertures may face an end of the housing. The first and second guide members may be disposed entirely between the openings of the terminal apertures and the end of the housing. The board may be selectively movable relative to the first and second guide members. The cradle may include a first aperture that threadably receives a fastener. The board may include a second aperture through which the fastener extends. The second aperture may include a larger diameter than the first aperture to allow adjustment of the board relative to the cradle when the fastener is received in the first and second apertures, but before a head of the fastener is tightened against the board. The first guide member may include first and second legs and a cross-member extending therebetween. The second guide member may include only a single leg that is substantially parallel to the first and second legs of the first guide member. Openings of the terminal contacts may face a first end of the cradle. The first and second guide members may be disposed between the openings of the terminal contacts and the first end of the cradle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
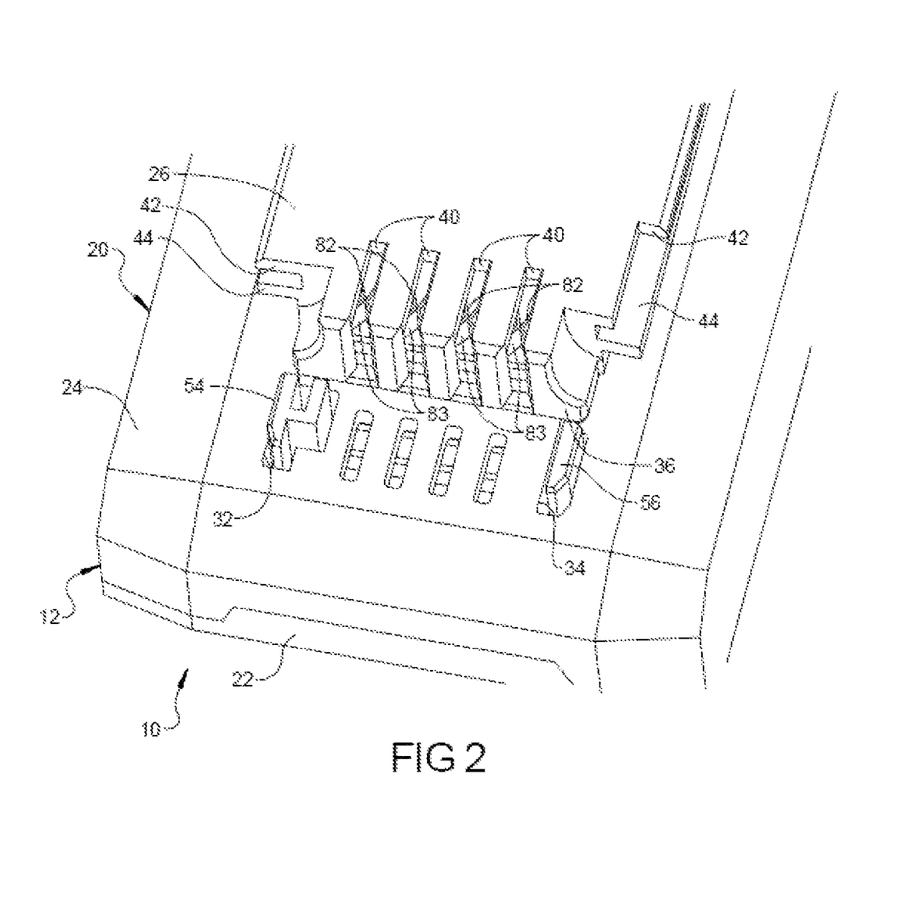
FIG. 2 is a partial perspective view of the battery pack of FIG. 1.
Figure 3:
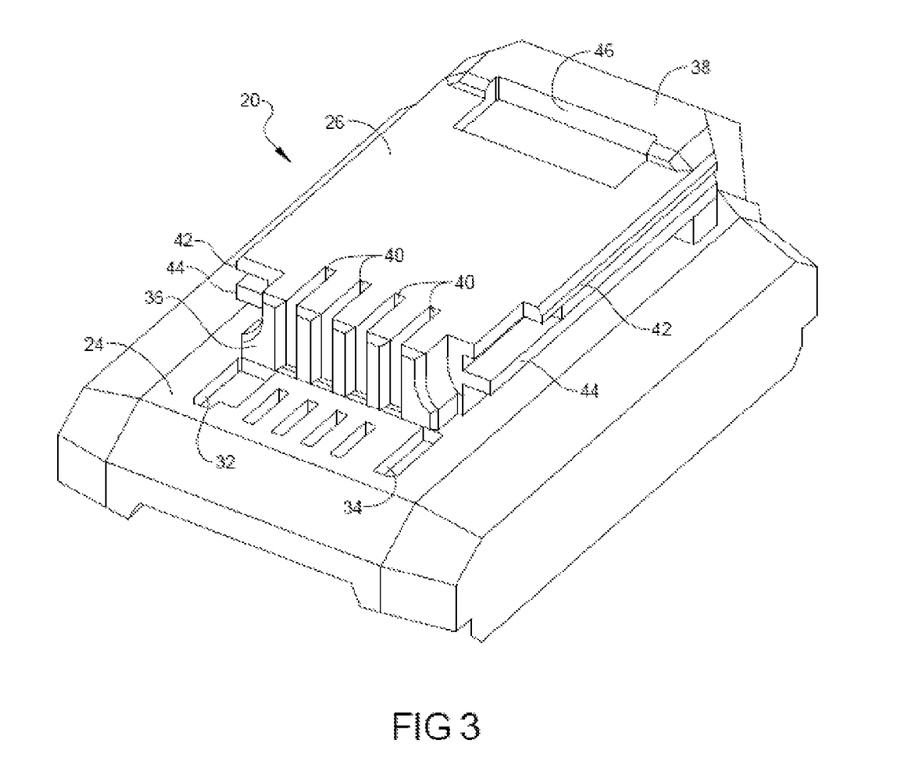
FIG. 3 is a perspective view of a portion of a housing of the battery pack.
Figure 4:
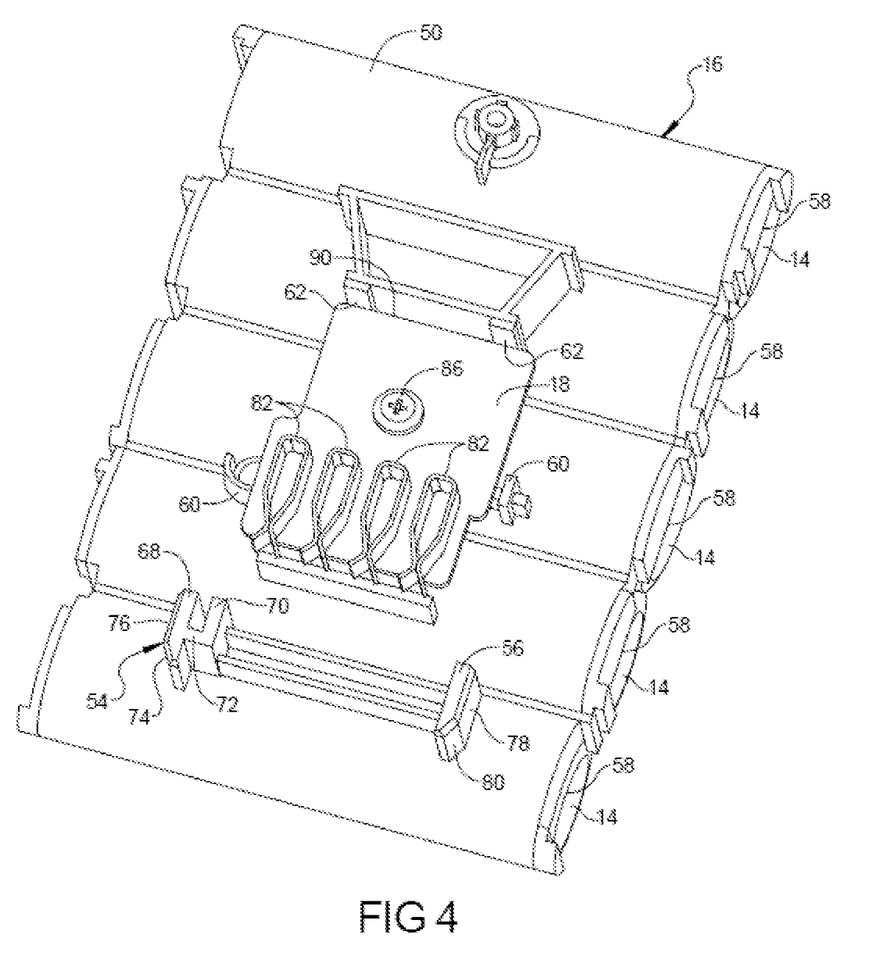
FIG. 4 is a perspective view of a cradle of the battery pack having a board mounted thereto according to the principles of the present disclosure.
Figure 5:
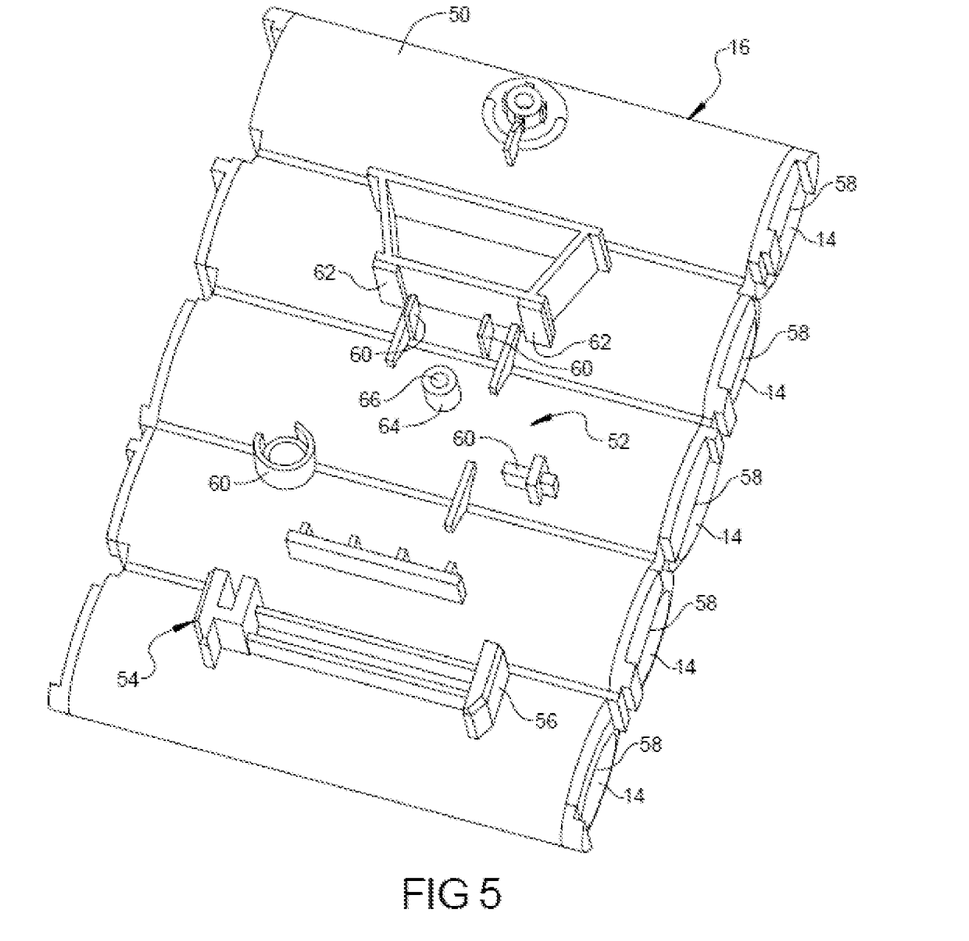
FIG. 5 is a perspective view of the cradle of FIG. 4.
Figure 6:
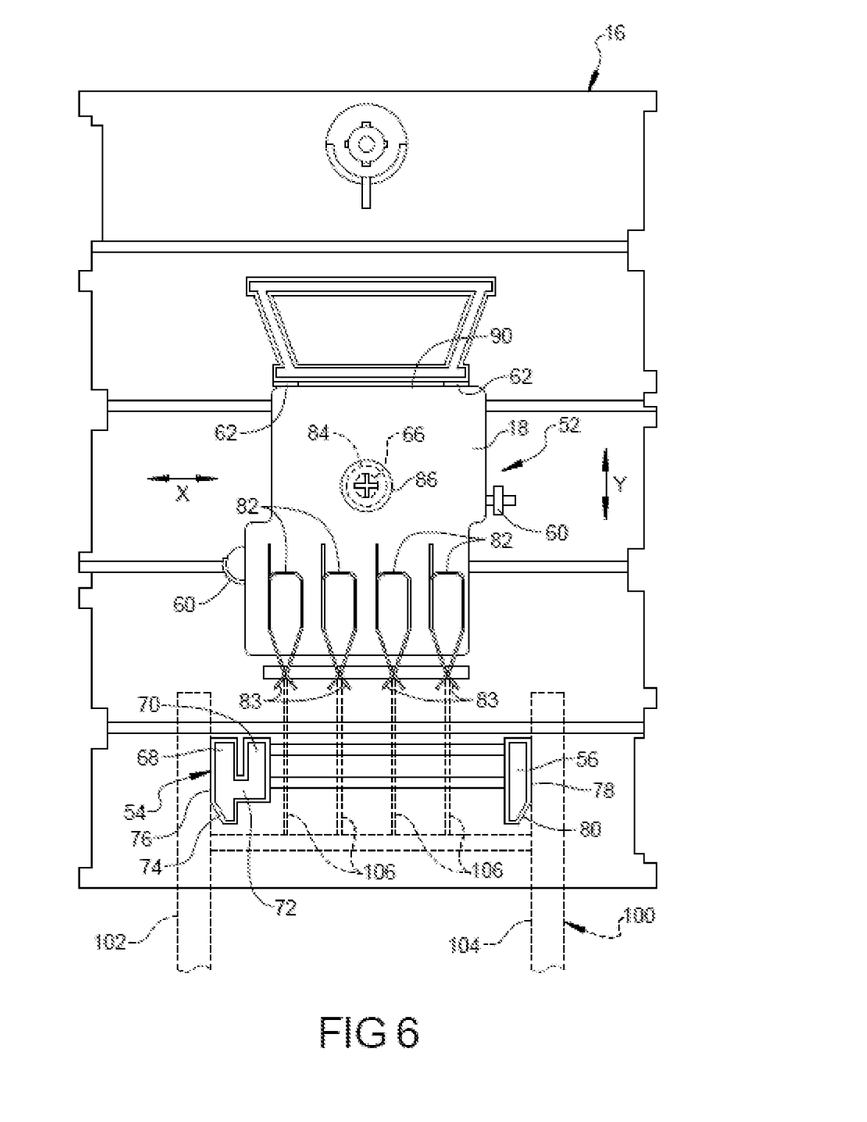
FIG. 6 is a plan view of the cradle and board with an alignment fixture engaging guide members and terminal contacts of the cradle and board, respectively, according to the principles of the present disclosure.

With reference to FIGS. 1-6, a battery pack 10 is provided that may include a housing assembly 12 (FIGS. 1 and 2), a plurality of battery cells 14 (FIGS. 4 and 5), a cradle 16 (FIGS. 4-6), and a board 18 (FIGS. 4 and 6). The battery pack 10 may be operatively connectable to one or more power tools, appliances and/or other electric devices (not shown) and to a battery charger (not shown).

Figure 1:
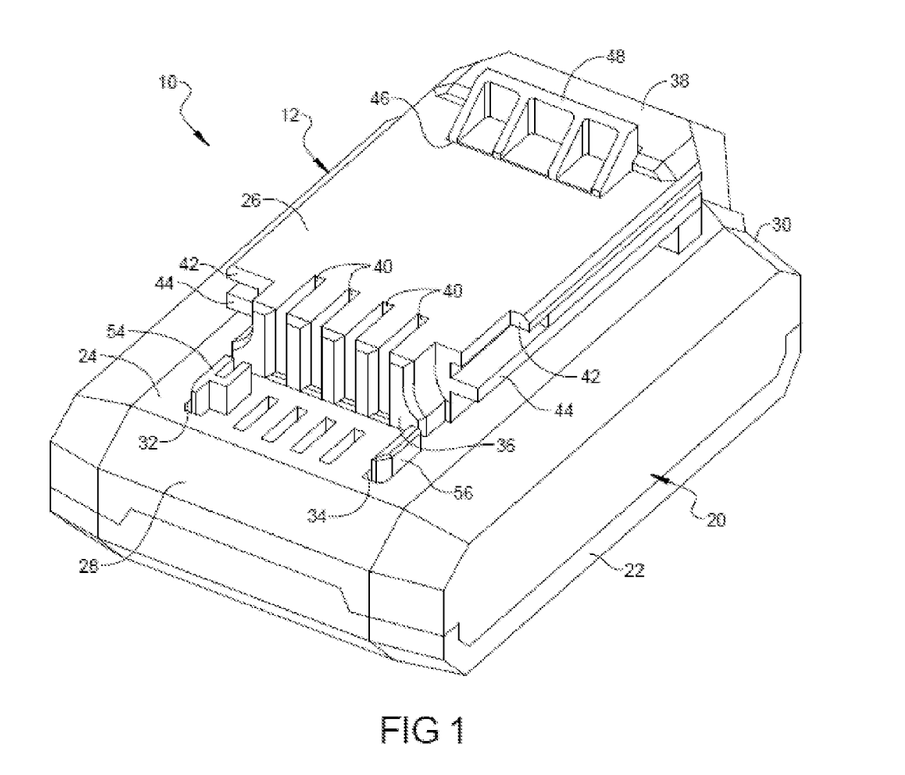
FIG. 1 is a perspective view of a battery pack according to the principles of the present disclosure.

As shown in FIGS. 1 and 2, the housing assembly 12 may include a top housing 20 and a bottom housing 22. The top and bottom housings 20, 22 may be molded and/or otherwise formed from a polymeric material, for example. The top and bottom housings 20, 22 may be joined together by a snap-fit, press-fit, one or more fasteners and/or any other suitable joining method. The top and bottom housings 20, 22 may cooperate to substantially enclose the battery cells 14, cradle 16 and board 18.

Referring now to FIGS. 1-3, the top housing 20 may include a base portion 24 and an upper portion 26 that slidably engage a power tool and battery charger. The base portion 24 may include first and second ends 28, 30 and first and second guide apertures 32, 34 disposed proximate the first end 28. The upper portion 26 may extend from the base portion 24 and may include first and second ends 36, 38. The first and second guide apertures 32, 34 may be disposed between the first end 28 of the base portion 24 and the first end 36 of the upper portion 26. The first end 36 of the upper portion 26 may include a plurality of terminal slots 40. The upper portion 26 may also include a first pair of guide rails 42 and a second pair of guide rails 44. Corresponding guide rails (not shown) of the power tool and battery charger may slidably engage the first and second pairs of guide rails 42, 44 to attach the battery pack 10 to the power tool or charger.

The second end 38 of the upper portion 26 may be generally aligned with the second end 30 of the base portion 24 and may include an opening 46 through which a latch 48 extends. The latch 48 may be a part of a release mechanism for releasing the battery pack 10 from engagement with the power tool or battery charger.

Referring now to FIGS. 4 and 5, the battery cells 14 may be supported by the bottom housing 22 and the cradle 16 and may be disposed therebetween. The battery cells 14 may include one or more of a lithium ion (Li-ion), nickel cadmium (NiCd), nickel metal hydride (NiMH) and/or lead-acid battery cells, for example, and/or any other type of battery cell. The battery cells 14 may be connected in series and/or parallel to each other and to the board 18. It will be appreciated that the battery pack 10 could include any number of battery cells 14.

Referring now to FIGS. 4-6, the cradle 16 may be molded or otherwise formed from a polymeric material, for example, and may include a body 50, a mounting interface 52, a first guide member 54 and a second guide member 56. The body 50, mounting interface 52 and first and second guide members 54, 56 may be integrally formed with each other. The body 50 may include a plurality of contoured recesses 58 in which corresponding battery cells 14 may be nested (as shown in FIG. 4). The battery cells 14 could be fixed to the cradle 16 by metallic straps (not shown), snap fit, fasteners and/or any other suitable attachment device or method. The body 50 of the cradle 16 may be fixedly attached to the top and/or bottom housings 20, 22 (FIG. 1) by a snap or press fit, one or more fasteners and/or any other attachment device or method.

The mounting interface 52 may support the board 18 within the housing assembly 12 and may include a plurality of bosses 60 and one or more stops 62 (shown best in FIG. 5). The bosses 60 may extend upward from the body 50 toward the top housing 20 and define a first plane above the body 50 upon which the board 18 is disposed. In some embodiments, the bosses 60 could be integrated into a single unitary feature or surface. The stops 62 may define a second plane against which the board 18 may be disposed. The second plane may be perpendicular to the first plane. The mounting interface 52 may also include an engagement feature, which in the particular example provided, is embodied as a boss 64 having a threaded aperture 66 (shown in FIG. 5).

The first and second guide members 54, 56 may extend upward from the body 50 and may protrude through the first and second guide apertures 32, 34, respectively, of the top housing 20 when the battery pack 10 is in a fully assembled state (as shown in FIGS. 1 and 2). The first guide member 54 may include a first leg 68, a second leg 70 and a cross-member 72. The first and second legs 68, 70 may be substantially parallel to each other and may be connected to each other by the cross-member 72. The first leg 68 may include a planar outer side 76. The first leg 68 may be longer than the second leg 70 and may include a chamfered portion 74. The second leg 70 and/or the cross-member 72 may be provided to restrict or prevent the battery pack 10 from being engaged with a tool or charger that is incompatible with the battery pack 10. That is, a tool or charger that is intended to operate with a battery pack of a different voltage, type and/or configuration may include structure that would interfere with the second leg 70 and/or cross-member 72 to prevent engagement therewith. It will be appreciated from the present disclosure that the first guide member 54 could include any other suitable shape and/or configuration.

The second guide member 56 may be substantially parallel to the first and second legs 68, 70 of the first guide member 54. The second guide member 56 may include a planar outer side 78 and a chamfered portion 80. The planar outer side 78 of the second guide member 56 may be parallel to the planar outer side 76 of the first guide member 54. It will be appreciated from the present disclosure that the second guide member 56 could include any other suitable shape and/or configuration.

The board 18 may be a printed circuit board and may be in electrical communication with the battery cells 14. The board 18 may include a plurality of terminal contacts 82 soldered thereon or otherwise attached thereto. In the particular example provided, the terminal contacts 82 are female tulip clips adapted to receive corresponding male blade terminals (not shown) of the power tool and battery charger. It will be appreciated that the terminal contacts 82 could include any type of male or female contacts. Flared openings 83 of the terminal contacts 82 may face toward the first end 36 of the top housing 20 such that when the battery pack 10 is in the fully assembled state (FIG. 1), the openings 83 of each of the terminal contacts 82 are aligned with a corresponding one of the terminal slots 40 so that male blade terminals of the power tool and battery charger can be received through the terminal slots 40 and openings 83 and engage the terminal contacts 82 when the battery pack 10 is fully engaged with the power tool or battery charger. In the particular example provided, the entire first and second guide members 54, 56 may be disposed between the terminal contacts 82 and the first end 28 of the base portion 24 of the top housing 20.

The board 18 may also include an aperture 84 (FIG. 6) through which a threaded fastener 86 may extend to threadably engage the threaded aperture 66 in the cradle 16. The aperture 84 may include a larger diameter than the threaded aperture 66 to enable the board 18 to move laterally relative to the cradle 16 in a direction X and/or a direction Y (shown in FIG. 6) while the fastener 86 is engaged with the apertures 66, 84, but before the fastener 86 is tightened down against the board 18. While the aperture 84 is shown in FIG. 6 as a circular hole, in some embodiments, the aperture 84 may include a slot that is elongated in the direction X. A back edge 90 of the board 18 may abut the stops 62 of the mounting interface 52 of the cradle 16. It will be appreciated that in some embodiments, the fastener 86 may be a self-tapping screw. In such embodiments, the boss 64 may be initially formed without the threaded aperture 66 (or initially formed with only a pilot hole), and the fastener 86 may be driven into the boss 64.

With reference to FIGS. 1-6, a method of manufacturing the battery pack 10 will be described. The cradle 16 and the top and bottom housings 20, 22 may each be molded and/or otherwise formed to include the features described above and/or shown in the figures. The board 18 may be mounted to the cradle 16 and positioned such that the terminal contacts 82 are in registration with one or both of the first and second guide members 54, 56, as will be described in more detail below.

With particular reference to FIGS. 4-6, a method of mounting the board 18 to the cradle 16 and positioning the board 18 relative to the cradle 16 will be described in detail. First, the board 18 may be placed on the bosses 60 of the mounting interface 52 of the cradle 16. Then, the board 18 may be positioned such that the aperture 84 in the board 18 is generally aligned with the threaded aperture 66 in the cradle 16. The fastener 86 can be inserted through the aperture 84 in the board 18 and threadably engaged with the threaded aperture 66 in the cradle 16.

Before the fastener 86 is fully tightened against the board 18 to fixedly secure the board 18 to the cradle 16, the position of the board 18 may be adjusted in the direction X and/or in the direction Y (FIG. 6) so that the terminal contacts 82 are in registration with one or both of the first and second guide members 54, 56. To adjust the position of the board 18 in the direction X, an alignment fixture 100 (shown schematically in FIG. 6 is phantom lines) may engage the first and second guide members 54, 56 and the terminal contacts 82. As shown in FIG. 6, the alignment fixture 100 may include first and second guide walls 102, 104 and a plurality of blade terminals 106 disposed between the guide walls 102, 104 and extending substantially parallel thereto. The first and second walls 102, 104 are positioned relative to each other and to the blade terminals 106 in a manner that matches corresponding guide rails and blade terminals of the power tool and battery charger.

The first and second guide walls 102, 104 of the alignment fixture 100 may be slid into engagement with the first and second guide members 54, 56 until the blade terminals 106 are inserted through the flared openings 83 of the terminal contacts 82. Contact between the blade terminals 106 and the openings 83 of the terminal contacts 82 may urge the board in the direction Y until the back edge 90 of the board 18 is in abutting contact with the stops 62 of the cradle 16. Any initial misalignment in the direction X between the openings 83 and the blade terminals 106 can be eliminated when the blade terminals 106 are received into the terminal contacts 82. That is, if the openings 83 are initially slightly misaligned with the blade terminals 106, insertion of the blade terminals 106 into the openings 83 of the terminal contacts 82 will cause the board 18 to move in the direction X to a position that aligns the openings 83 with the blade terminals 106. Once the board 18 is positioned relative to the first and second guide members 54, 56, the fastener 86 can be tightened against the board to fixedly secure the board 18 relative to the cradle 16.

Referring again to FIGS. 1-6, the battery cells 14 may be received in the contoured recesses 58 of the cradle 16 and, in some embodiments, may be snap fit and/or otherwise attached to the cradle 16 in a manner that allows the battery cells 14 to electrically communicate with the terminal contacts 82. The battery cells 14 and cradle 16 may then be received into the bottom housing 22. It will be appreciate that the board 18 could be mounted to the cradle 16 and aligned relative to the guide members 54, 56 before or after the cradle 16, battery cells 14 and bottom housing 22 are attached to each other. It will be appreciated that, in some embodiments, the battery cells 14 could be received in the bottom housing 22 and then the cradle 16 (with or without the board 18 mounted thereon) could be placed over the battery cells 14 and engaged with the bottom housing 22.

Next, the top housing 20 is placed over the cradle 16 and board 18 such that the first and second guide members 54, 56 protrude through the first and second guide apertures 32, 34, respectively, and the terminal contacts 82 are aligned with the terminal slots 40 (shown best in FIG. 2). When the first and second guide members 54, 56 of the cradle 16 are received through the first and second guide apertures 32, 34 in the top housing 20, the fit between the guide members 54, 56 and respective guide apertures 32, 34 ensures that the top housing 20 is positioned relative to the cradle 16 such that the terminal slots 40 are precisely aligned with the terminal contacts 82. The top housing 20 can then be secured to the bottom housing 22 via a snap fit, one or more fasteners, ultrasonic welding, adhesive, and/or any suitable attachment means. In some embodiments, the cradle 16 could include one or more additional posts or bosses (not shown) that engage one or more slots or apertures (not shown) in an underside of the top housing 20 to ensure proper positioning or alignment of the cradle 16 relative to the top housing 20.

Positioning the board 18 such that the terminal contacts 82 are in registration with the first and second guide member 54, 56, as described above, can prevent the terminal contacts 82 from being bent or otherwise damaged when the battery pack 10 is engaged with the power tool or the battery charger. That is, when the power tool or battery charger is slid into engagement with the battery pack 10, guide rails of the power tool or battery charger may slidably engage the first and second guide members 54, 56 protruding through the top housing 20. This engagement will ensure that the blade terminals of the power tool or battery charger are properly aligned with the terminal contacts 82, so that the terminal contacts 82 and blade terminals are not bent or otherwise damaged when the blade terminals are inserted into the terminal contacts 82. Preventing such damage to the terminal contacts 82 and blade terminals will improve the longevity and reliability of the battery pack 10, the power tool and battery charger.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A battery pack comprising:
   one or more battery cells;
   a cradle having a top surface and a bottom surface, where the bottom surface is configured to nest the battery cells;
   first and second guide members integrally formed with the cradle and protruding from the to surface of the cradle;
   a board mounted to the top surface of the cradle and being selectively movable relative to the first and second guide members;
   a plurality of terminal contacts mounted to the top surface of the board and electrically connected with the battery cells, the guide member being adapted to guide a device into engagement with the terminal contacts; and
   a housing at least partially enclosing the cradle and the battery cells and including first and second a guide apertures and a plurality of terminal apertures, the first and second guide member protruding through the first and second guide apertures, respectively, each of the terminal apertures being aligned with a corresponding one of the plurality of terminal contacts, wherein openings of the terminal apertures face an end of the housing and the first and second guide members are disposed between the openings of the terminal apertures and the end of the housing.

2. The battery pack of claim 1, wherein the guide member is disposed entirely between openings of the terminal apertures and an end of the housing that the terminal apertures face.

3. The battery pack of claim 1, wherein the cradle includes a first aperture that threadably receives a fastener that secures the board to the cradle, and wherein the board includes a second aperture through which the fastener extends, the second aperture includes a larger diameter than the first aperture to allow adjustment of the board relative to the cradle when the fastener is initially received in the first and second apertures.

4. The battery pack of claim 1, wherein the guide member includes first and second legs and a cross-member extending therebetween.

5. The battery pack of claim 4, wherein the cradle includes another guide member engaging another guide aperture in the housing and having only a single leg that is substantially parallel to the first and second legs of the first guide member.

6. The battery pack of claim 1, wherein openings of the terminal contacts face a first end of the cradle, and wherein the guide member is disposed between the openings of the terminal contacts and the first end of the cradle.

7. The battery pack of claim 1, wherein the plurality of terminal contacts includes a plurality of tulip clips.

8. The battery pack of claim 1, wherein the board includes a printed circuit board.

9. A battery pack comprising:
   a plurality of battery cells;
   a cradle including first and second sides, the first side including first and second guide members integrally formed therewith and extending therefrom, the second side facing the battery cells;
   a board mounted to the cradle and including a plurality of terminal contacts electrically connected with the battery cells; and a housing at least partially enclosing the cradle and the battery cells and including first and second guide apertures and a plurality of terminal apertures, the first and second guide members protruding through the first and second guide apertures, respectively, each of the terminal apertures being aligned with a corresponding one of the plurality of contacts, wherein openings of the terminal apertures face an end of the housing, and the first and second guide members are disposed entirely between the openings of the terminal apertures and the end of the housing;

wherein the board is selectively movable relative to the first and second guide members, wherein the cradle includes a first aperture that threadably receives a fastener, and the board includes a second aperture through which the fastener extends, and wherein the second aperture includes a larger diameter than the first aperture to allow adjustment of the board relative to the cradle when the fastener is initially received in the first and second apertures, wherein the first guide member includes first and second legs and a cross-member extending therebetween, wherein the second guide member includes only a single leg that is substantially parallel to the first and second legs of the first guide member, wherein openings of the terminal contacts face a first end of the cradle, and wherein the first and second guide members are disposed between the openings of the terminal contacts and the first end of the cradle.

* * * * *

UNITED STATES PATENT AND TRADEMARK OFFICE
CERTIFICATE OF CORRECTION

PATENT NO.       : 9,065,106 B2
APPLICATION NO.  : 13/677670
DATED            : June 23, 2015
INVENTOR(S)      : Rodney D. Milbourne et al.

Page 1 of 1

It is certified that error appears in the above-identified patent and that said Letters Patent is hereby corrected as shown below:

In the claims,

Column 8,

Line 13 (Claim 1), "to" should be -- top --.

Line 22 (Claim 1), after "second" delete "a".

Signed and Sealed this
Tenth Day of November, 2015

Michelle K. Lee
*Director of the United States Patent and Trademark Office*